United States Patent
Marose

[15] 3,672,700
[45] June 27, 1972

[54] SNOWMOBILE DEVICE
[72] Inventor: Glen Edward Marose, Des Moines, Iowa
[73] Assignee: Snowmobile, Ltd., Des Moines, Iowa
[22] Filed: Jan. 28, 1971
[21] Appl. No.: 110,387

[52] U.S. Cl..........................280/150 R, 40/129 C, 180/5 R, 248/293, 287/93, 280/150 C
[51] Int. Cl..........................................................B60r 27/00
[58] Field of Search......................280/150 C, 150 R, 150 B; 248/294, 293; 296/102; 287/93; 40/129 C, 129 R

[56] References Cited

UNITED STATES PATENTS

| | | | |
|---|---|---|---|
| 1,205,800 | 11/1916 | Schwartzberg | 40/129 C |
| 2,324,614 | 7/1943 | Dalton | 40/129 C |
| 2,586,643 | 2/1952 | Garlow | 280/150 R |
| 3,146,001 | 8/1964 | McFadyen | 280/150 C |

*Primary Examiner*—Benjamin Hersh
*Assistant Examiner*—Robert R. Song
*Attorney*—Zarley, McKee & Thomte

[57] ABSTRACT

The snowmobile device is adapted to be mounted on a snowmobile and includes a vertically disposed first member and an obliquely disposed second member secured at its upper end to the first member at a point intermediate the opposite ends of the first member. Hinges are mounted on the lower ends of the first and second members and are rigidly secured to the snowmobile. The lower ends of the first and second members extend through the hinges and are provided with nuts on opposite ends of the hinges which are turnable for tightening against the hinges so as to prevent swinging movement of the first and second members with respect to the hinges. Modified forms of the device may include a light mounted at the upper end of the first member, a flat or pennant mounted at the upper end of the first member, and insulating means between the hinges and the snowmobile.

10 Claims, 5 Drawing Figures

PATENTED JUN 27 1972
3,672,700
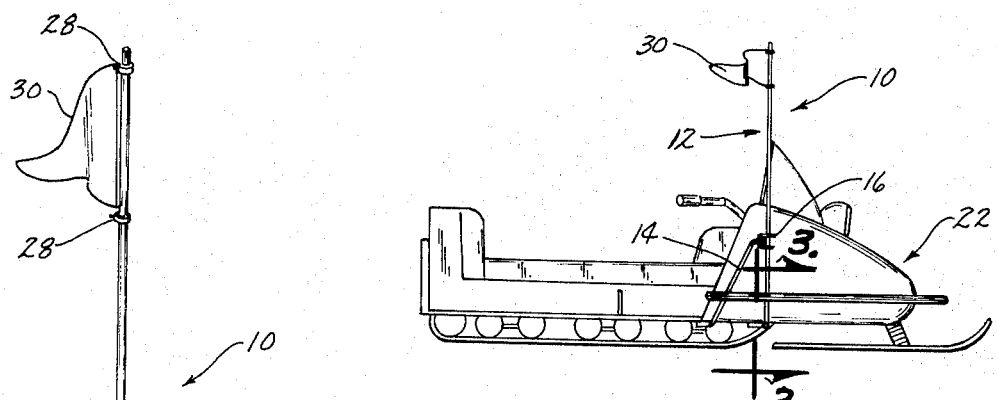
Fig. 1
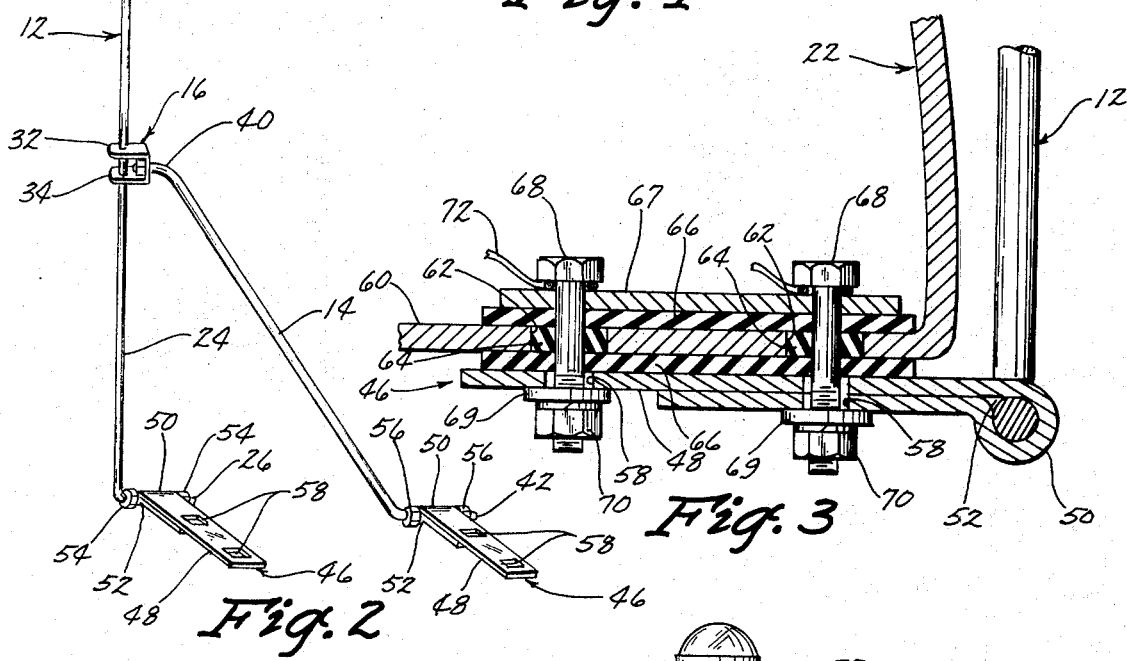
Fig. 2
Fig. 3
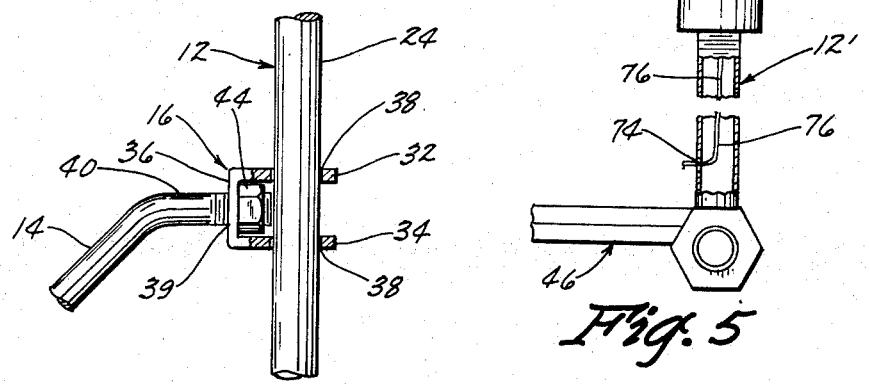
Fig. 4
Fig. 5
INVENTOR
GLEN EDWARD MAROSE
BY
Zarley, McKee & Thomte
ATTORNEYS

SNOWMOBILE DEVICE

This invention relates generally to snowmobiles and particularly to a snowmobile device adapted to be mounted on a snowmobile.

The use of snowmobiles has become a very popular recreational activity recently in geographical areas where snow is prevalent during the winter. Because of the rough terrain over which the snowmobiles often travel, and because of the high speed at which they travel, there is substantial danger of overturning or rolling the snowmobile. It is therefore desirable to have a bar or protective device for protecting the passengers of the snowmobile if it should tip.

Another serious danger to users of snowmobiles is the hazard presented by barbed wire fences and low hanging branches. The device of the present invention guards and shields the user from such hazards.

Many snowmobile enthusiasts have organized clubs which get together for outings both during the daytime and at night. Many of these clubs have their own emblems, flags, or pennants which they display during the use of their snowmobiles. It is therefore desirable to have a device for displaying these emblems. Furthermore, during the dark hours, it is desirable to have means for carrying lights both from the standpoint of safety and from the standpoint of recognition.

Therefore a principal object of the present invention is the provision of a snowmobile device which will protect the passengers of the snowmobile should the snowmobile tip or roll over.

A further object of the present invention is the provision of a snowmobile device which will permit the display of emblems of various recreational clubs and organizations.

A further object of the present invention is the provision of a snowmobile device which can carry lights for use during the dark hours so that the snowmobile will be easily seen in the dark.

A further object of the present invention is the provision of a snowmobile device which can be easily mounted on any particular brand or make of snowmobile.

A further object of the present invention is the provision of a snowmobile device which may be used as a radio antenna.

A further object of the present invention is the provision of a snowmobile device which can be easily swung to a number of other positions and secured rigidly therein.

A further object of the present invention is the provision of a snowmobile device which will shield the user of the snowmobile from barbed wire fences and low hanging branches.

A further object of the present invention is the provision of a snowmobile device which is economical to manufacture, durable to use, and attractive in appearance.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the snowmobile device;

FIG. 2 is a side elevational view of the snowmobile device mounted on a snowmobile;

FIG. 3 is an enlarged sectional view taken along line 3 — 3 of FIG. 1;

FIG. 4 is an enlarged view of the securing bracket which secures the oblique member to the vertical member; and FIG. 5 is a broken front elevational view of a modification of the present invention.

Referring to the drawings, a snowmobile device 10 includes a vertical first member 12, an oblique second member 14, and a securing bracket 16. The numeral 22 designates the snowmobile with which snowmobile device 10 is to be used.

First member 12 includes a vertically disposed portion 24 and a horizontally disposed portion 26 which forms an L-shape at the lower end of vertically disposed portion 24. Horizontally disposed portion 26 is threaded along a substantial portion of its length. Adjacent the upper end of vertically disposed portion 24 are a pair of eyelets 28 which are adapted for permitting the mounting of a flag or pennant 30 thereto.

Securing bracket 16 includes upper and lower horizontal legs 32, 34 which are joined by a vertical leg 36 so as to form a C-shape in cross section (FIG. 4). Upper and lower horizontal legs 32, 34 are each provided with an aperture 38. Apertures 38 are in vertical alignment and vertically disposed portion 24 of first member 12 extends slidably through apertures 38. Vertical leg 36 also includes an aperture 39 extending therethrough.

Second member 14 is provided with a substantially horizontal upper end 40 and a substantially horizontal lower end 42, both of which are threaded substantially along their entire lengths. Upper end 40 of second member 14 extends through aperture 39 of vertical leg 36. A nut 44 is threaded over the threads on upper end 40, and is positioned between vertical leg 36 and vertically disposed portion 24 of first member 12. Bracket 16 is held against sliding movement on vertical portion 24 of first member 12 by forcibly turning nut 44 on upper end 40 so as to force upper end 40 into pressing engagement with vertically disposed portion 24 of first member 12.

Lower end 26 of first member 12 and lower end 42 of second member 14 are both horizontally disposed, are both threaded along their entire substantial lengths, and are both in registered alignment along a horizontal line. A pair of hinge members 46 each include a plate portion 48 and a collar portion 50. Collar portions 50 form longitudinal bores 52 extending therethrough. Lower ends 26, 42 of first and second members 12, 14 extend through bores 52 of collars 50. Threadably secured over lower ends 26 and positioned on opposite ends of collar 50 are a pair of nuts 54 which may be tightened to prevent swinging movement of first member 12 with respect to hinge member 46. A similar pair of nuts 56 is threadably secured over lower end 42 of second member 14 and embrace the opposite end of collar 50.

Each hinge member 46 includes a pair of square apertures 58 extending through plate portions 48. Referring to FIGS. 2 and 3, snowmobile device 10 is secured to snowmobile 22 in the following manner. Snowmobile 22 includes a floor 60 having apertures 62 extending therethrough. Within each aperture 62 is mounted an annular dielectric washer 64. A pair of dielectric plates 66 embraces the upper and lower surfaces of floor 60. A steel reinforcing plate 67 is positioned above the uppermost dielectric plate 66. Steel plate 67 is not necessary if floor 60 of snowmobile 22 is metal, but it provides more rigid securement when floor 60 is made of fiberglass as is commonly the case. Extending downwardly through reinforcing plate 67, dielectric plate 66, floor 60, and apertures 58 of hinge members 46, are a pair of bolts 68. Washers 64 and dielectric plates 66 insulate bolts 68 from snowmobile 22. The lower ends of bolts 68 extend through washers 69 and are threaded through a pair of nuts 70 which are tightened to press washers 69 against hinge members 46. Both hinge members 46 are secured to snowmobile 22 in the above described manner so that snowmobile device 10 is completely insulated from snowmobile 22. A pair of lead wires 72 may be secured underneath the heads of bolts 68 and may be connected to the antenna wires of a radio (not shown) in snowmobile 22. Thus, snowmobile device 10 will function as an antenna if it is constructed of metallic material.

Snowmobile device 10 may be mounted either in a vertical position as shown in the drawings or it may be swung about its hinge connection to hinge members 46 to any of a variety of positions with respect to vertical. Nuts, 54, 56 are tightened when the desired position of snowmobile device 10 is attained, and these nuts hold the snowmobile device against swinging movement about hinge members 46. Because of this adjustability provided by nuts 54 and by the slidable adjustment of securing bracket 16, the device of the present invention may be adapted to any of a variety of makes and designs of snowmobiles.

Referring to FIG. 5, a modification of the present invention may be attained by providing an electric light fixture 73 at the extreme upper end of a vertical first member 12'. Vertical member 12' is similar to vertical member 12 of the modification shown in FIGS. 1 – 4, but is hollow and includes at its lower end an aperture 74 so as to permit a lead wire 76 to be threaded from light fixture 72 downwardly through vertical member 12' and outwardly through aperture 74.

Vertical member 12 can be varied in height according to the preference of the user. For example, if snowmobile device 10 is used as a radio antenna then it would be desirable to use a longer vertical member 12. Member 12 is preferably chrome plated so as to have a decorative appeal making it more attractive to use as a standard for a pennant.

In both modifications of the device shown in the drawings, the vertically disposed member extends upwardly beyond the uppermost portion of the snowmobile 22, so as to provide protection for the passengers of the snowmobile should the snowmobile tip or roll over during use. The device may be used in the daytime with the pennant 30, and the modification shown in FIG. 5 will greatly enhance the safety of the snowmobile during the night because it will make the snowmobile more visible. Furthermore, the light will define the highest point of the snowmobile to observers at night because it is positioned well above the snowmobile.

Vertical member 12 is positioned forwardly of the passenger carrying portion of snowmobile 22 so that it will shield the passengers from low hanging branches or barbed wire in the event the snowmobile encounters these hazards. However, the flexible means of attachment embodied in snowmobile device 10 permits the device to be mounted on either side of the snowmobile and at any position along the length of the snowmobile according to the individual needs or preferences of the user.

Snowmobile device 10 is almost universally adapted to any type of snowmobile by virtue of the fact that it can be adjusted to swing about hinge members 46 so as to conform to any uniquely shaped size of a particular snowmobile design. Thus it can be seen that the invention accomplishes at least all of its stated objectives.

I claim:

1. A device adapted to be mounted on a snowmobile, said device comprising, a first member having an upper end and a lower end, said upper end being approximately vertically disposed and said lower end being approximately horizontally disposed;

a second member having an upper end operatively secured to said first member at a point above said lower end of said first member, said second member having a lower end which is approximately horizontally disposed;

a pair of hinges adapted to be rigidly mounted to said snowmobile, said hinges each having a bore extending therethrough;

said lower ends of said first and second members extending rotatably through said bores of said hinges; said lower ends having threaded portions protruding beyond the opposite ends of said bores; and a pair of nut means on each of said lower ends of said first and second members, each of said pairs of nut means embracing one of said hinges therebetween and being turnable for tightening against said hinges so as to prevent swinging of said first and second members with respect to said hinges.

2. A device according to claim 1 wherein said upper end of said first member includes securing means thereon for detachably securing an emblem displaying device thereon.

3. A device according to claim 2 wherein a flag is mounted to said securing means.

4. A device according to claim 1 wherein an electric light is mounted on said upper end of said first member.

5. A device according to claim 4 wherein said first member is a hollow tube and lead wires extend within said tube from said electric light downwardly and out through an aperture in said tube adjacent its lower end.

6. A device according to claim 1 wherein said first member is sufficiently long to protrude a substantial distance above the highest part of said snowmobile.

7. A device according to claim 1 wherein said second member extends obliquely downwardly from its upper end with respect to said second member, said lower ends of said first and second members being longitudinally in horizontal alignment.

8. A device according to claim 1 wherein said upper end of said second member is secured to said first member by means of a securing bracket, said securing bracket being slidably mounted on said first member and including a nut threadably mounted on said upper end of said second member; said upper end of said second member being threadable through said nut into engagement with said first member for preventing sliding movement of said bracket on said first member.

9. A device according to claim 8 wherein said bracket includes a horizontal upper leg, a horizontal lower leg, and a vertical leg which together form a C-shape, said first member extending slidably through a pair of vertically aligned apertures in said horizontal upper and lower legs, said upper end of said second member extending through an aperture in said vertical leg, said nut being between said first member and said aperture in said vertical leg.

10. A device according to claim 1 including dielectric means adapted to be secured between said hinges and said snowmobile so as to insulate said device from said snowmobile, said hinges having terminal means for permitting the electrical connection of a radio antenna wire to said device.

* * * * *